(12) United States Patent
Hayes

(10) Patent No.: US 9,217,324 B2
(45) Date of Patent: *Dec. 22, 2015

(54) METHOD AND APPARATUS FOR INVESTIGATING A BOREHOLE WITH A CALIPER

(75) Inventor: John A. Hayes, Gainesville, FL (US)

(73) Assignee: LOADTEST, INC., Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/353,648

(22) Filed: Jan. 14, 2009

(65) Prior Publication Data

US 2009/0219784 A1      Sep. 3, 2009

Related U.S. Application Data

(63) Continuation of application No. 11/641,356, filed on Dec. 18, 2006, now Pat. No. 7,495,995.

(60) Provisional application No. 60/751,361, filed on Dec. 16, 2005.

(51) Int. Cl.
| | |
|---|---|
| *G01V 1/52* | (2006.01) |
| *G01V 1/44* | (2006.01) |
| *E21B 47/08* | (2012.01) |
| *E02D 1/02* | (2006.01) |
| *E21B 47/01* | (2012.01) |
| *G01V 1/46* | (2006.01) |

(52) U.S. Cl.
CPC .............. *E21B 47/082* (2013.01); *E02D 1/02* (2013.01); *E21B 47/01* (2013.01); *G01V 1/46* (2013.01)

(58) Field of Classification Search
CPC ......... E02D 1/02; E21B 47/01; E21B 47/082; G01V 1/46
USPC ......... 367/25, 35, 99, 902; 181/105; 507/118, 507/120, 121, 122, 220, 221, 225; 73/152.12; 33/314; 374/136, 137, 143, 374/167, E1.004
See application file for complete search history.

(56) References Cited

U.S. PATENT DOCUMENTS

| | | | |
|---|---|---|---|
| 3,369,626 A | | 2/1968 | Zemanek, Jr. |
| 3,656,344 A | * | 4/1972 | Johns .......................... 73/152.12 |
| 4,131,875 A | * | 12/1978 | Ingram ............................ 367/35 |
| 4,255,798 A | * | 3/1981 | Havira ............................ 367/35 |
| RE31,074 E | * | 11/1982 | Nolte .......................... 73/152.58 |

(Continued)

FOREIGN PATENT DOCUMENTS

| | | | | |
|---|---|---|---|---|
| EP | 0671547 A1 | | 9/1995 | |
| EP | 671547 A1 | * | 9/1995 | .............. E21B 21/08 |

(Continued)

OTHER PUBLICATIONS

Ensoft Newsletter, Oct. 2005. Ensoft, Inc.*

(Continued)

*Primary Examiner* — Daniel L Murphy
(74) *Attorney, Agent, or Firm* — Saliwanchik, Lloyd & Eisenschenk

(57) ABSTRACT

Embodiments of the present invention relate to a caliper and method for mapping the dimensions and topography of a formation such as the sidewall of a borehole. Examples of formations in which embodiments of the invention can be used include, but are not limited to, an oil, gas, pile borehole or barrette that has been drilled or excavated into the earth.

31 Claims, 1 Drawing Sheet

(56) References Cited

U.S. PATENT DOCUMENTS

| | | | |
|---|---|---|---|
| 4,524,433 A * | 6/1985 | Broding | 367/25 |
| 4,571,693 A | 2/1986 | Birchak et al. | |
| 4,601,024 A * | 7/1986 | Broding | 367/86 |
| 4,829,486 A * | 5/1989 | Broding | 367/25 |
| 4,829,488 A * | 5/1989 | Siegfried, II. | 367/69 |
| 4,890,676 A | 1/1990 | Mason | |
| 4,916,648 A * | 4/1990 | Gard | 367/35 |
| 4,945,775 A * | 8/1990 | Adams et al. | 73/865.8 |
| 5,216,638 A * | 6/1993 | Wright | 367/35 |
| 5,341,345 A * | 8/1994 | Warner et al. | 367/99 |
| 5,663,123 A * | 9/1997 | Goodhue et al. | 507/225 |
| 6,125,079 A * | 9/2000 | Birchak et al. | 367/35 |
| 6,466,513 B1 * | 10/2002 | Pabon et al. | 367/35 |
| 7,495,995 B2 | 2/2009 | Hayes | |
| 2005/0128873 A1 * | 6/2005 | LaBry | 367/35 |
| 2006/0262643 A1 * | 11/2006 | Blankinship et al. | 367/25 |
| 2006/0271299 A1 * | 11/2006 | Ward et al. | 702/6 |

FOREIGN PATENT DOCUMENTS

| | | |
|---|---|---|
| FR | 1007184 A | 5/1952 |
| FR | 2082093 | 12/1971 |
| FR | 2402188 | 3/1979 |
| WO | WO 02/081865 A1 | 10/2002 |

OTHER PUBLICATIONS

Ensoft, Inc. Newsletter, Austin, TX, Oct. 2005.*
Schlumberger Oilfield Glossary, http://www.glossary.oilfield.slb.com/Display.cfm?Term=formation, 2011, downloaded Aug. 11, 2011.*
Schlumberger product sheet, http://www.slb.com/~/media/Files/evaluation/product_sheets/other/large_hole_fe.ashx, Aug. 2004, downloaded Aug. 10, 2011).*
Collier et al., "Utilization of the Borehole Televiewer in Fracture Analysis," 1992, available at http://info.ngwa.org/gwol/pdf/920157325.PDF.*
"Acoustic Logging," Environmental Protection Agency, last updated Dec. 12, 2011, downloaded May 9, 2013 from http://www.epa.gov/esd/cmb/GeophysicsWebsite/pages/reference/methods/Borehole_Geophysical_Methods/Logging_Techniques_and_Tools/Acoustic_Logging.htm.*

* cited by examiner

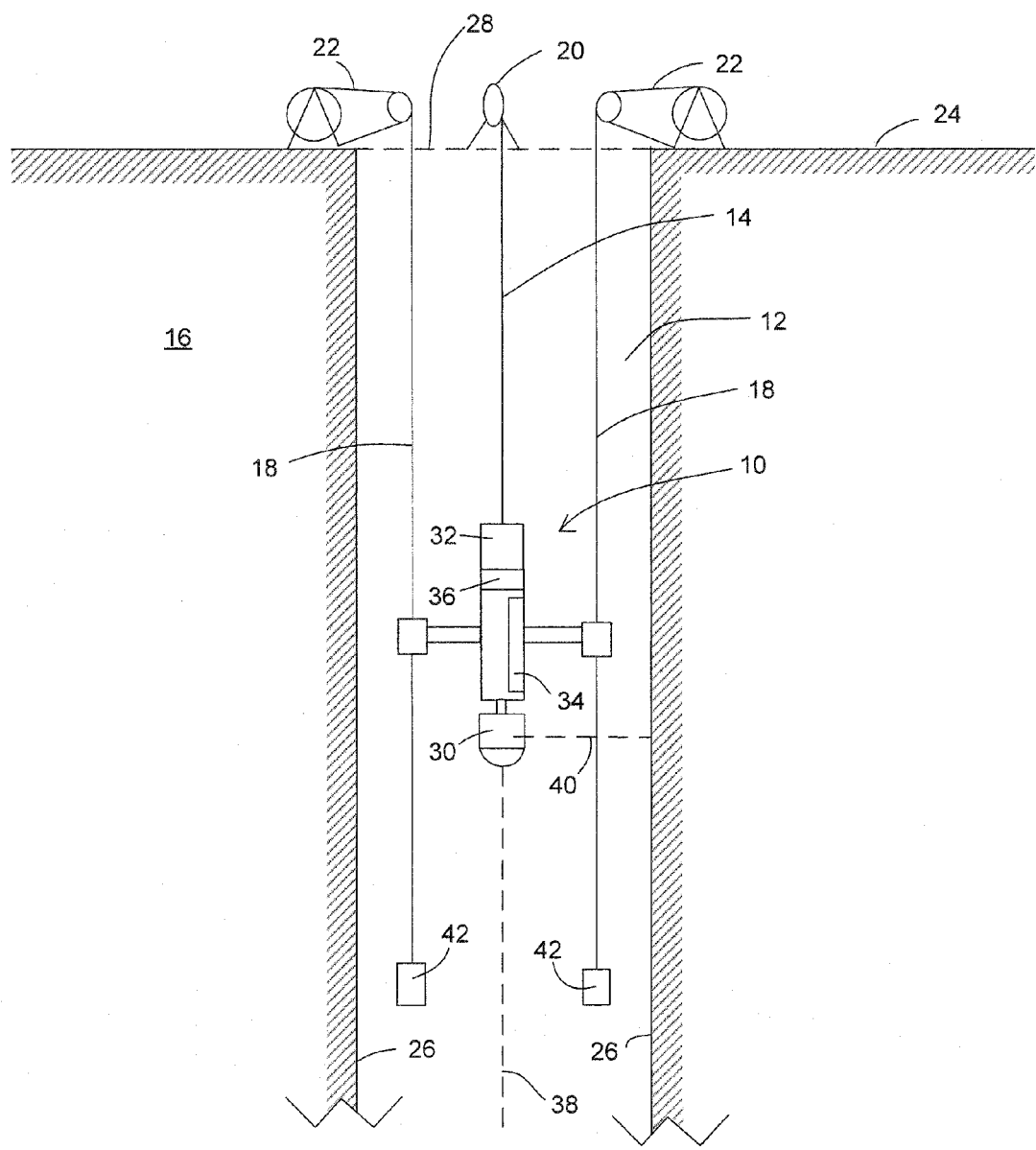

METHOD AND APPARATUS FOR INVESTIGATING A BOREHOLE WITH A CALIPER

CROSS-REFERENCE TO RELATED APPLICATION

The present application is a continuation of U.S. patent application Ser. No. 11/641,356, filed Dec. 18, 2006, now U.S. Pat. No. 7,495,995, which claims the benefit of U.S. Provisional Patent Application Ser. No. 60/751,361, filed Dec. 16, 2005, both of which are hereby incorporated by reference herein in their entirety, including any figures, tables, or drawings

BACKGROUND OF INVENTION

When formations such as boreholes are drilled or otherwise created into earth, the actual shape of the formation, including dimensions and/or topology, can be useful information to have prior to filling the formation. The formation can be filled with, for example, concrete and/or other materials to form a pile or other structure. As such piles are often used to form the foundations of buildings or other large structures. As such the piles are often tested to determine the load-bearing capacity of the pile and the tests typically involve the incorporation of a device for performing testing. The shape of the cross-section of the pile in the region of the pile where the test device is positioned can enhance the accuracy of the interpretation of the data from the test device. In addition, the shape of formation can be useful to determine if there are any major irregularities and/or determine the potential interaction between the pier and the sides of the formation when a load is applied. In addition, the accumulation of cross-sectional shapes can be used to calculate the volume of the formation.

Techniques for providing information regarding the shape of formations have included lowering a sonar device in the formation and obtaining two or more vertical lines of sonar readings along the walls of the formation. However, such limited information can miss important irregularities in the sides of the formation. In addition, data from regions of the formation having dirty fluids can be difficult to accurately interpret. In fact, the radial diameters of the formations in regions with dirty fluids can appear narrower than they actually are due to the effects of the particulates in the fluid on the sonar signals.

Accordingly, there is a need in the art for a method and apparatus that can provide accurate information regarding the dimensions and/or topology of a formation such as a borehole, especially when the formation is filled with opaque stabilizing fluids whose density often varies with depth.

BRIEF SUMMARY

Embodiments of the present invention relate to a caliper and method for mapping the dimensions and topography of a formation such as the sidewall of a borehole. Examples of formations in which embodiments of the invention can be used include, but are not limited to, an oil, gas, pile borehole or barrette that has been drilled or excavated into the earth. Such dimensional and topographic information can allow more accurate interpretation of test devices positioned in the pile created within the borehole and can allow an accurate determination of the volume of concrete needed to fill the pile. Such information can also allow more accurate projections of the interaction of the side of the pile with the side of the borehole, especially when the formation is filled with opaque stabilizing fluids whose density often varies with depth.

BRIEF DESCRIPTION OF THE DRAWINGS

FIG. 1 is a longitudinal cross-sectional view of a borehole with an embodiment of a caliper in accordance with the present invention in the borehole.

DETAILED DISCLOSURE OF THE INVENTION

Embodiments of the present invention relate to a caliper and method for mapping the dimensions and topography of a formation such as the sidewall of a borehole. Examples of formations in which embodiments of the invention can be used include, but are not limited to, an oil, gas, pile borehole or barrette that has been drilled or excavated into the earth. Such dimensional and topographic information can allow more accurate interpretation of test devices positioned in the pile created within the borehole and can allow an accurate determination of the volume of concrete needed to fill the pile. Such information can also allow more accurate projections of the interaction of the side of the pile with the side of the borehole.

FIG. 1 shows one embodiment of caliper 10 suspended in borehole 12 by cable 14. Borehole 12 penetrates into the earth 16. One or more guide cables 18 can also be suspended down into borehole 12. In one embodiment, two guide cables 18 are parallel to each other and are weighted 42 to fall plumb into borehole 12. In one embodiment, one or more cables 14, 18 include a conductor for transmitting commands and/or power to caliper 10 and for receiving data back from caliper 10. Caliper 10 can be raised and lowered on cable 14 by draw works 20, moving slidably along guide cables 18. Guide cables 18 are raised and lowered independently of cable 14, by draw works 22. In one embodiment, all guide cables 18 are coordinated by being raised and lowered by a single draw work assembly 22. Draw works 20, 22 can be of any type known in the art, including pulley systems. Draw works 20, 22 are typically installed at ground level 24. In an embodiment, draw works 20 and 22 are connected to a common frame structure. In further embodiments, draw works 20 and 22 can be such that the raising and lowering of a plurality of cables 18 is in unison.

In one embodiment, guide cables 18 are suspended independently of cable 14, which carries caliper 10. This arrangement allows for greater positional control of guide cables 18. Positional control of guide cables 18 is desirable for preventing contact between caliper 10 and interior wall 26 of borehole 12 as caliper 10 descends and ascends, guided by guide cables 18. Positioning guide cables 18 in borehole 12 and then lowering caliper 10 as caliper 10 is guided by guide cable 18 can allow a more accurate determination of the position of caliper 10. In an alternative embodiment, cable 14 can be removed and caliper 10 can incorporate means for moving caliper 10 to propel itself up and down by gripping on cables 18. Means for propelling up and down a cable are known in the art and can be incorporated in caliper 10 for this purpose. In additional embodiments, caliper 10 can be fixably attached to one or more cables 18 and the caliper 10 lowered by lowering cable 18 to which the caliper is fixably attached and/or enabling caliper 10 to travel with respect to one or more cable 18 to which the caliper 10 is not fixably attached. In another embodiment, caliper 10 can incorporate a gyroscopic stabilizer and an internal compass to allow the caliper 10 to be raised and lowered without the use of guide cables 18.

Caliper 10 is insertable into opening 28 of borehole 12 and can include sonar head 30 for transmitting acoustical energy toward interior wall 26 of borehole 12. When the acoustic energy reaches interior wall 26 the acoustic waves are reflected by interior wall 26 back to sonar head 30. Sonar head 30 detects the acoustic waves and measures the elapsed time between transmission of the acoustical energy and detection of the acoustic waves. From elapsed time measurements, the distance from the sonar head to the interior wall and back in a certain direction can be determined, allowing determination of the location of interior wall 26 relative to sonar head 30. Additional embodiments can incorporate a light source, such as a laser source. This laser source can be used instead of the sonar head 30 or in conjunction with sonar head 30. The laser source can transmit a light beam toward interior wall 26 that can be reflected by interior wall 26 and detected by caliper 10. Again, by measuring the elapsed time between transmission and detection of the light, the distance from the laser source to the interior wall 26 in a certain direction can be determined, allowing determination of the location of the interior wall 26.

In one embodiment, caliper 10 includes a motor (not shown). In one embodiment, caliper 10 includes gears and shafts for enabling the motor to rotate sonar head 30. In various embodiments, caliper 10 can include one or more of the following; gyroscope stabilizer 32, internal inclinometer 34, internal compass 36, and pressure measuring device. A pressure measuring device can measure the pressure of the caliper's environment in the fluid in the formation, where the pressure is a function of the depth and density of the fluid and can, for example, be used to provide the density of the fluid when the depth is known. In one embodiment, as caliper 10 is raised or lowered in borehole 12, current is supplied to the motor via cable 14 which connects caliper 10 to a generator (not shown) on ground level 24. Other electrical signals can travel down cable 14 and/or cable 18. In one embodiment, sonar head 30 is rotated by the motor as caliper 10 advances along borehole axis 38. Acoustic pulses emitted from sonar head 30 along borehole radius 40 can scan borehole wall surfaces 26 with such pulses emitted either as the caliper 10 with sonar head 30 is continuously raised or lowered, or at multiple fixed depths of the borehole that the sonar head 30 is sequentially raised or lowered to. By rotating sonar head 30 as the caliper 10 is raising or lowering, a spiral or helical pattern of measurements can be accomplished, while allowing continuous movement of the caliper 10 and the sonar head.

The speed of the caliper 10 raising or lowering can be varied with time when, for example, it is desired to have more or fewer measurements of a certain portion of the borehole. Likewise, the rotation speed of the caliper head 10 can vary with time if, for example, it is desired to have more or fewer measurements of a certain portion of the borehole. A portion of the energy from each acoustic pulse, or laser pulse, is reflected by wall surface 26 of borehole 12 along radius 40 back toward sonar head 30, which detects the reflected energy. The reflections contain information relating to the topographic features and contours of walls 26 of borehole 12. The number of measurements per unit area of bore hole wall 26 can be controlled by controlling the speed of raising and/or lowering sonar head 30 and/or controlling the rotation speed of sonar head 30. In an embodiment, sonar head 30 rotates one full rotation between advancement intervals of caliper 10 along borehole axis 38. In this case, information is gathered in planar fields at discrete locations along axis 38.

In one embodiment, electronic modules (not shown) on ground level 24 transmit operating commands down borehole 12 and in return, receives data back that may be recorded on a storage medium of any desired type for concurrent or later manual or automated processing. Data processor means, such as a suitable computer, may be provided for performing data analysis in the field in real time. In addition or in the alternative, the recorded data may be sent to a processing center for post processing of the data.

Because borehole 12 may contain a fluid that changes in density with changes in depth or other position, caliper 10 can be calibrated to take these changes into effect. In one embodiment, because the distance between sonar head 30 and each guide cable 18 is known and constant during a particular operation, a pulse can be directed at a guide cable 18 and the time lapse between transmission and detection measured. Changes in return speed at different positions along axis 38 can be used to calibrate caliper 10 to take fluid properties into account to improve the accuracy of the measurement of the distance from the sonar head 30 to the walls 26. In an embodiment, a pulse can be reflected from cable 18 for each rotation of the sonar head 30 to provide calibration of the speed of sound and/or light in the surrounding material for that depth. In another embodiment, a sonar pulse and a laser pulse can be reflected from a known location on or near the walls 26 and the difference in the speed of sound and the speed of light in the surrounding material can be used to calibrate the measurement results for the surrounding material.

In one embodiment, multiple excitation frequencies are available from which the operator can choose, depending on factors such as the type and properties of fluid in borehole 12. The choice of excitation frequency is a compromise between the need for signal penetration through the borehole fluid using a longer-wavelength, lower frequency pulse, more acoustic energy (the borehole fluid can have undesirably attenuating effects at higher pulse frequencies) and the need for spatial resolution that is achievable using shorter wavelengths albeit at the expense of higher signal transmission losses. Embodiments can utilize multiple frequencies during the same measurement. A specific embodiment of the invention pertains to measuring the physical characteristics of a borehole having a diameter between 1.5 feet and 20 feet, and in another embodiment between 3 feet and 12 feet. In one specific embodiment, an excitation frequency in the range 50 kHz-300 kHz is used; in another specific embodiment, an excitation frequency in the range 500 kHz-800 kHz is used; and in a further specific embodiment, an excitation frequency in the range 1.0 MHz-1.5 MHz is used.

In one embodiment, an inclinometer 42, can be attached to the end, or other location, of cable 18, rather than merely weights. Thus, if guide cables 18 are not able to hang freely, inclinometers 42 can provide an output signal indicative of the orientation of the end of each guide cable 18 in the borehole 12. This situation may be encountered where borehole 12 is not sufficiently vertical, with respect to gravity, for example.

Embodiment 1. An apparatus for investigating a formation, comprising:

a caliper adapted to be lowered into a formation such that an axis of the caliper is substantially parallel with the longitudinal axis of the formation, wherein the caliper comprises:

a transmitter for transmitting a transmitted pulse signal;

a detector for detecting a reflected pulse signal, wherein the reflected pulse signal is the transmitted pulse signal reflected from a target location on a surface of the formation onto which the transmitted pulse signal is incident;

a means for determining the time interval between the transmission of the transmitted pulse signal and the detection of the reflected pulse signal, wherein the distance from the transmitter to the target location on the surface of the formation and back to the detector is the time interval between the transmission of the transmitted pulse signal and the detection of the reflected pulse signal times the speed of the first pulse signal;

a means for rotating the transmitter and the detector with respect to the axis of the caliper, wherein rotation of the transmitter and the detector causes the target location on the surface of the formation onto which the transmitted pulse signal is incident to rotate with respect to the axis of the caliper.

Embodiment 2. The apparatus according to Embodiment 1, wherein the formation is a borehole.

Embodiment 3. The apparatus according to Embodiment 1, further comprising:

a means for raising and lowering the caliper in the formation, wherein raising and lowering the caliper in the formation causes the target location on the surface of the formation to raise and lower, respectively.

Embodiment 4. The apparatus according Embodiment 3, further comprising:

a means for controlling the rotation of the transmitter and detector and the raising and lowering of the caliper such that the first pulse signal is incident on a plurality of target locations on the surface of the formation, and a means for producing a representation of a portion of the formation corresponding to the plurality of target locations on the surface of the formation onto which the transmitter signal is incident.

Embodiment 5. The apparatus according to Embodiment 3, further comprising:

one or more guide cables for guiding the caliper as the caliper is raised and/or lowered in the formation, wherein the one or more guide cables allow the position of the caliper to be controlled as the caliper is raised and/or lowered in the formation.

Embodiment 6. The apparatus according to Embodiment 1, wherein the transmitter comprises a laser light source.

Embodiment 7. The apparatus according to Embodiment 1, wherein the transmitter comprises a sonar head.

Embodiment 8. The apparatus according to Embodiment 5, wherein the one or more guide cables are weighted to fall plumb into the formation.

Embodiment 9. The apparatus according to Embodiment 8, wherein at least one of the one or more guide cables is weighted with an inclinometer for providing an output signal indicative of the orientation of the at least one guide cable.

Embodiment 10. The apparatus according to Embodiment 5, further comprising a means for raising and/or lowering the caliper up and down the at least one of the one or more guide cables by gripping on the at least one guide cable.

Embodiment 11. The apparatus according to Embodiment 5, wherein the caliper is attached to at least one of the one or more guide cables, wherein the means for raising and lowering the caliper comprises a means for raising and lowering the at least one guide cable attached to the caliper such that raising and lowering the at least one guide cable attached to the caliper raises and lowers the caliper.

Embodiment 12. The apparatus according to Embodiment 5, wherein the means for raising and lowering the caliper comprises a cable attached to the caliper.

Embodiment 13. The apparatus according to Embodiment 10, wherein one or more of the one or more guide cables and the cable comprise a conductor for transmitting commands and/or power to the caliper and for receiving data back from caliper.

Embodiment 14. The apparatus according to Embodiment 1, wherein the caliper further comprises a compass.

Embodiment 15. The apparatus according to Embodiment 1, wherein the caliper further comprises a gyroscopic stabilizer.

Embodiment 16. The apparatus according to Embodiment 1, further comprising a means for determining the speed of the transmitted pulse signal.

Embodiment 17. The apparatus according to Embodiment 16, wherein the means for determining the speed of the transmitted pulse signal comprises an object a known distance from the transmitter wherein the speed of the transmitted pulse signal is the distance from the transmitter to the object and back to the detector divided by the time interval between the transmission of the transmitted pulse signal and the detection of the reflected pulse signal from the object.

Embodiment 18. The apparatus according to Embodiment 7, wherein the sonar head transmits in the range 50 kHz-300 kHz.

Embodiment 19. The apparatus according to Embodiment 7, wherein the sonar head transmits in the range 500 kHz-800kHz.

Embodiment 20. The apparatus according to Embodiment 7, wherein the sonar head transmits in the range 1.0 MHz-1.5 MHz.

Embodiment 21. The apparatus according Embodiment 1, further comprising a means for determining the density of a fluid the transmitted pulse signal travels into the target location.

Embodiment 22. The apparatus according to Embodiment 21, wherein the means for determining the density of the fluid the transmitted pulse signal travels in comprises a pressure measuring device.

Embodiment 23. The apparatus according to Embodiment 1, wherein the caliper further comprises an inclinometer.

Embodiment 24. An method for investigating a formation, comprising:

positioning a caliper into a formation such that an axis of the caliper is substantially parallel with the longitudinal axis of the formation, transmitting a transmitted pulse signal from a transmitter on the caliper;

detecting a reflected pulse signal with a detector on the caliper, wherein the reflected pulse signal is the transmitted pulse signal reflected from a target location on a surface of the formation onto which the transmitted pulse signal is incident;

determining the time interval between the transmission of the transmitted pulse signal and the detection of the reflected pulse signal, wherein the distance from the transmitter to the target location on the surface of the formation and back to the detector is the time interval between the transmission of the transmitted pulse signal and the detection of the reflected pulse signal times the speed of the first pulse signal;

rotating the transmitter and the detector with respect to the axis of the caliper, wherein rotation of the transmitter and the detector causes the target location on the surface of the formation onto which the transmitted pulse signal is incident to rotate with respect to the axis of the caliper.

Embodiment 25. The method according to Embodiment 24, wherein the formation is a borehole.

Embodiment 26. The method according to Embodiment 24, further comprising:

raising and lowering the caliper in the formation, wherein raising and lowering the caliper in the formation causes the target location on the surface of the formation to raise and lower, respectively.

Embodiment 27. The method according Embodiment 26, further comprising:

controlling the rotation of the transmitter and detector and the raising and lowering of the caliper such that the first pulse signal is incident on a plurality of target locations on the surface of the formation, and producing a representation of a portion of the formation corresponding to the plurality of target locations on the surface of the formation onto which the transmitter signal is incident.

Embodiment 28. The method according to Embodiment 26, further comprising:
guiding the caliper on one or more guide cables as the caliper is raised and/or lowered in the formation, wherein the one or more guide cables allow the position of the caliper to be controlled as the caliper is raised and/or lowered in the formation.

Embodiment 29. The method according to Embodiment 24, wherein the transmitter comprises a laser light source.

Embodiment 30. The method according to Embodiment 24, wherein the transmitter comprises a sonar head.

Embodiment 31. The method according to Embodiment 28, wherein the one or more guide cables are weighted to fall plumb into the formation.

Embodiment 32. The method according to Embodiment 31, wherein at least one of the one or more guide cables is weighted with an inclinometer for providing an output signal indicative of the orientation of the at least one guide cable.

Embodiment 33. The method according to Embodiment 28, further comprising raising and/or lowering the caliper up and down the at least one of the one or more guide cables by gripping on the at least one guide cable.

Embodiment 34. The method according to Embodiment 28, wherein the caliper is attached to at least one of the one or more guide cables, wherein raising and lowering the caliper comprises raising and lowering the at least one guide cable attached to the caliper such that raising and lowering the at least one guide cable attached to the caliper raises and lowers the caliper.

Embodiment 35. The method according to Embodiment 28, wherein raising and lowering the caliper comprises raising and lowering the caliper via a cable attached to the caliper.

Embodiment 36. The method according to Embodiment 33, further comprising transmitting commands and/or power to the caliper and for receiving data back from caliper via a conductor in one or more of the one or more guide cables and/or the cable.

Embodiment 37. The method according to Embodiment 24, wherein the caliper further comprises a compass.

Embodiment 38. The method according to Embodiment 24, wherein the caliper further comprises a gyroscopic stabilizer.

Embodiment 39. The method according to Embodiment 24, further comprising determining the speed of the transmitted pulse signal.

Embodiment 40. The method according to Embodiment 39, wherein determining the speed of the transmitted pulse signal comprises positioning an object a known distance from the transmitter wherein the speed of the transmitted pulse signal is the distance from the transmitter to the object and back to the detector divided by the time interval between the transmission of the transmitted pulse signal and the detection of the reflected pulse signal from the object.

Embodiment 41. The method according to Embodiment 30, wherein the sonar head transmits in the range 50 kHz-300 kHz.

Embodiment 42. The method according to Embodiment 30, wherein the sonar head transmits in the range 500 kHz-800 kHz.

Embodiment 43. The method according to Embodiment 30, wherein the sonar head transmits in the range 1.0 MHz-1.5 MHz.

Embodiment 44. The method according Embodiment 24, further comprising determining the density of a fluid the transmitted pulse signal travels into the target location.

Embodiment 45. The method according to Embodiment 44, wherein determining the density of the fluid the transmitted pulse signal travels in comprises measuring the pressure in the fluid the transmitted pulse signal travels in.

Embodiment 46. The method according to Embodiment 24, wherein the caliper further comprises an inclinometer.

Embodiment 47. The method according to Embodiment 24, wherein the formation has a diameter in the range 1.5 feet to 20 feet.

Embodiment 48. The method according to Embodiment 24, wherein the formation has a diameter in the range 3 feet to 12 feet.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to a person skilled in the art and are to be included within the spirit and purview of this application. For example, while the use of sonar energy has been described, it is contemplated that the apparatus and method can be adapted to use laser energy, for example.

What is claimed is:

1. An apparatus for investigating a formation, comprising:
a caliper adapted to be suspended into a formation such that an axis of the caliper is substantially vertical when the caliper is suspended into the formation, wherein the formation has a diameter in the range of 1.5 feet to 20 feet, wherein the caliper is adapted to be suspended into the formation such that the axis of the caliper is substantially vertical when suspended in the formation having a diameter in the range of 1.5 feet to 20 feet, wherein the formation is filled with opaque stabilizing fluids whose density varies with depth, wherein the longitudinal axis of the formation is vertical, wherein the caliper is adapted to be suspended into the formation such that the axis of the caliper is substantially vertical when suspended in the formation having a vertical longitudinal axis, wherein the caliper comprises:
a transmitter for transmitting a transmitted pulse signal, wherein the transmitter comprises a sonar head, wherein the transmitted pulse signal is a sonar pulse signal;
a detector for detecting a reflected pulse signal, wherein the reflected pulse signal is the transmitted pulse signal reflected from a target location on a surface of the formation onto which the transmitted pulse signal is incident;
a means for determining the time interval between the transmission of the transmitted pulse signal and the detection of the reflected pulse signal, wherein the distance from the transmitter to the target location on the surface of the formation and back to the detector is the time interval between the transmission of the transmitted pulse signal and the detection of the reflected pulse signal times the speed of the first pulse signal;
a means for rotating the transmitter and the detector with respect to the axis of the caliper, wherein rotation of the transmitter and the detector causes the target location on the surface of the formation onto which the transmitted pulse signal is incident to rotate with respect to the axis of the caliper; and a means for mapping the dimensions and topography of the formation.

2. The apparatus according to claim 1, wherein the formation is a borehole.

3. The apparatus according to claim 1, further comprising:
a means for raising and lowering the caliper in the formation, wherein raising and lowering the caliper in the formation causes the target location on the surface of the formation to raise and lower, respectively.

4. The apparatus according to claim 3, further comprising:
a means for controlling the rotation of the transmitter and detector and the raising and lowering of the caliper such that the first pulse signal is incident on a plurality of target locations on the surface of the formation, and a means for producing a representation of a portion of the formation corresponding to the plurality of target locations on the surface of the formation onto which the transmitter signal is incident.

5. The apparatus according to claim 1, wherein the caliper further comprises a compass.

6. The apparatus according to claim 1, wherein the caliper further comprises a gyroscopic stabilizer.

7. The apparatus according to claim 1, further comprising a means for determining the speed of the transmitted pulse signal.

8. The apparatus according to claim 7, wherein the means for determining the speed of the transmitted pulse signal comprises an object a known distance from the transmitter wherein the speed of the transmitted pulse signal is the distance from the transmitter to the object and back to the detector divided by the time interval between the transmission of the transmitted pulse signal and the detection of the reflected pulse signal from the object.

9. The apparatus according to claim 1, further comprising a means for determining the density of a fluid in which the transmitted pulse signal travels to the target location.

10. The apparatus according to claim 9, wherein the means for determining the density of the fluid the transmitted pulse signal travels in comprises a pressure measuring device.

11. The apparatus according to claim 1, wherein the caliper further comprises an inclinometer.

12. The apparatus according to claim 1, wherein the sonar head transmits in the range 50 kHz-300 kHz.

13. The apparatus according to claim 1, wherein the sonar head transmits in the range 500 kHz-800 kHz.

14. The apparatus according to claim 1, where the transmitter comprises a sonar head, wherein the sonar transmits in the range 1.0 MHz-1.5 MHz.

15. The apparatus according to claim 1, wherein the formation has a diameter in the range of 3 feet to 12 feet, wherein the caliper is adapted to be suspended into the formation such that the axis of the caliper is substantially vertical when suspended in the formation having a diameter in the range of 3 feet to 12 feet.

16. A method for investigating a formation, comprising:
suspending a caliper into a formation such that an axis of the caliper is substantially vertical when the caliper is suspended into the formation, wherein the formation has a diameter in the range of 1.5 feet to 20 feet, wherein the formation is filled with opaque stabilizing fluids whose density varies with depth, wherein the longitudinal axis of the formation is vertical, wherein the caliper is adapted to be suspended into the formation such that the axis of the caliper is substantially vertical when suspended in the formation having a vertical longitudinal axis, transmitting a transmitted pulse signal from a transmitter on the caliper, wherein the transmitter comprises a sonar head, wherein, the transmitted pulse signal is a sonar pulse signal;

detecting a reflected pulse signal with a detector on the caliper, wherein the reflected pulse signal is the transmitted pulse signal reflected from a target location on a surface of the formation onto which the transmitted pulse signal is incident;

determining the time interval between the transmission of the transmitted pulse signal and the detection of the reflected pulse signal, wherein the distance from the transmitter to the target location on the surface of the formation and back to the detector is the time interval between the transmission of the transmitted pulse signal and the detection of the reflected pulse signal times the speed of the first pulse signal;

rotating the transmitter and the detector with respect to the axis of the caliper, wherein rotation of the transmitter and the detector causes the target location on the surface of the formation onto which the transmitted pulse signal is incident to rotate with respect to the axis of the caliper; and mapping the dimensions and topography of the formation, wherein transmitting a transmitted pulse signal from a transmitter on the caliper comprises transmitting a transmitted pulse signal from a transmitter on the caliper while the caliper is suspended into the formation, wherein detecting a reflected pulse signal with a detector on the caliper comprises detecting a reflected pulse signal with a detector on the caliper while the caliper is suspended into the formation, wherein rotating the transmitter and the detector with respect to the axis of the caliper comprises rotating the transmitter and the detector with respect to the axis of the caliper while the caliper is suspended into the formation.

17. The method according to claim 16, wherein the formation is a borehole.

18. The method according to claim 16, further comprising:
raising and lowering the caliper in the formation, wherein raising and lowering the caliper in the formation causes the target location on the surface of the formation to raise and lower, respectively.

19. The method according to claim 18, further comprising:
controlling the rotation of the transmitter and detector and the raising and lowering of the caliper such that the first pulse signal is incident on a plurality of target locations on the surface of the formation, and producing a representation of a portion of the formation corresponding to the plurality of target locations on the surface of the formation onto which the transmitter signal is incident.

20. The method according to claim 16, wherein the sonar head transmits in the range 50 kHz-300 kHz.

21. The method according to claim 16, wherein the sonar head transmits in the range 500 kHz-800 kHz.

22. The method according to claim 16, wherein the sonar head transmits in the range 1.0 MHz-1.5 MHz.

23. The method according to claim 16, wherein the caliper further comprises a compass.

24. The method according to claim 16, wherein the caliper further comprises a gyroscopic stabilizer.

25. The method according to claim 16, further comprising determining the speed of the transmitted pulse signal.

26. The method according to claim 25, wherein determining the speed of the transmitted pulse signal comprises positioning an object a known distance from the transmitter wherein the speed of the transmitted pulse signal is the distance from the transmitter to the object and back to the detector divided by the time interval between the transmission of the transmitted pulse signal and the detection of the reflected pulse signal from the object.

27. The method according to claim 16, further comprising determining the density of a fluid the transmitted pulse signal travels into the target location.

28. The method according to claim 27, wherein determining the density of the fluid the transmitted pulse signal travels in comprises measuring the pressure in the fluid the transmitted pulse signal travels in.

29. The method according to claim 16, wherein the caliper further comprises an inclinometer.

30. The method according to claim 16, wherein the formation has a diameter in the range 3 feet to 12 feet.

31. The method according to claim 16, wherein transmitting a transmitted pulse signal from a transmitter on the caliper comprises transmitting a transmitted pulse signal from a transmitter on the caliper while the caliper is suspended into the formation, wherein detecting a reflected pulse signal with a detector on the caliper comprises detecting a reflected pulse signal with a detector on the caliper while the caliper is suspended into the formation, wherein rotating the transmitter and the detector with respect to the axis of the caliper comprises rotating the transmitter and the detector with respect to the axis of the caliper while the caliper is suspended into the formation.

* * * * *